US006875919B1

(12) United States Patent
Hsieh

(10) Patent No.: US 6,875,919 B1
(45) Date of Patent: Apr. 5, 2005

(54) FOLDING LAMP ROD AND JUNCTION BOX STRUCTURE FOR LAMPS

(76) Inventor: Pi-Hua Hsieh, No. 18, Ping-Ho 10 Street, Lu-Ping Li, Changhua city (TW)

( * ) Notice: Subject to any disclaimer, the term of this patent is extended or adjusted under 35 U.S.C. 154(b) by 0 days.

(21) Appl. No.: 10/667,445

(22) Filed: Sep. 23, 2003

(51) Int. Cl.[7] .................................................. H02G 3/08

(52) U.S. Cl. ............................ 174/50; 174/57; 174/58; 174/65 R; 220/3.2; 220/4.02; 248/906

(58) Field of Search ............................. 174/50, 48, 61, 174/63, 58, 17 R, 57, 54, 65 R; 220/3.2, 3.3, 3.6, 3.7, 3.8, 4.02; 362/405, 410, 470, 226, 95; 248/906; 439/527, 550, 544

(56) References Cited

U.S. PATENT DOCUMENTS 6,441,302 B1 * 8/2002 Wu ............................ 174/50
6,455,775 B1 * 9/2002 Wu ............................ 174/54
6,489,560 B1 * 12/2002 Wu ......................... 174/65 R
6,589,075 B1 * 7/2003 Wu ........................... 439/550
6,600,102 B1 * 7/2003 Wu ............................ 174/50
6,617,513 B1 * 9/2003 Wu ......................... 174/65 R
6,685,346 B2 * 2/2004 Wu ........................... 362/405
6,692,140 B2 * 2/2004 Wu ........................... 362/370
6,743,978 B2 * 6/2004 Wu ............................ 174/50

* cited by examiner

*Primary Examiner*—Dean A. Reichard
*Assistant Examiner*—Angel R. Estrada
(74) *Attorney, Agent, or Firm*—Dennison, Schultz, Dougherty & MacDonald

(57) ABSTRACT

A folding lamp rod and junction box structure for lamps comprised of a junction box and lamp rods hinged to the junction box. The junction box has a plurality of portals appropriately arrayed along the plane of its circumference and, furthermore, a pivot hole is formed in the top surface at the lateral edge of each portal in the junction box to provide for movably locating the lamp rods. Each lamp rod has a joint section at its proximal section that is hinged to the junction box and, furthermore, the joint section is coupled via the junction box the pivot hole. The lamp rod has a spring element situated at an appropriate area and, furthermore, the vertex portion of the spring element protrudes slightly to the circumferential edge. When the joint section is conjoined to the junction box, the spring element vertex portion engages the lateral edge of the junction box portal, thereby securing the lamp rod onto the junction box portal. As such, the lamp rod and junction box angle is appropriately adjustable into a parallel arrangement to thereby reduce the overall space occupied by the lamp rods and the junction box when they are shipped.

6 Claims, 8 Drawing Sheets

FOLDING LAMP ROD AND JUNCTION BOX STRUCTURE FOR LAMPS

BACKGROUND OF THE INVENTION

1) Field of the Invention

The invention herein relates to lighting fixtures, specifically a folding lamp rod and junction box structure for lamps in which a junction box and the lamp rods are hinged together. Said lamp rod has a spring element situated at an appropriate area and, furthermore, the vertex portion of the spring element protrudes slightly to the circumferential edge. When the lamp rod joint section is conjoined to the junction box, said spring element vertex portion engages the lateral edge of the junction box portal, thereby securing the lamp rod onto the junction box portal. As such, the lamp rod and junction box angle can be appropriately adjusted into a parallel arrangement to thereby reduce the space occupied by the lamp rods and the junction box when they are shipped.

2) Description of the Prior Art

Lamps now in the highest demand are models of reduced dimensions that have lower shipping costs and, furthermore, provide for user safety and convenient assembly, with such features indispensable for raising market competitiveness. However, in order to prevent electrocution hazards, conventional products are typically delivered from the manufacturer with the light bulb sockets on the lamp rods pre-wired in advance, which significantly enlarges packaging dimensions and increases shipping costs. Furthermore, during user assembly and installation, since the light bulb sockets and the junction box are already wired, separation is not possible. As the light bulb sockets and the junction box are in a permanent arrangement such that the angle between the light bulb sockets and the junction box cannot be further adjusted, this also results in higher shipping expenditures.

To enable the examination committee a further understanding of the structure, features, capabilities, and practical objectives of the folding lamp rod and junction box structure for lamps herein, the brief description of the drawings below is followed by the detailed description of the invention herein.

DETAILED DESCRIPTION OF THE INVENTION

Figure 1:
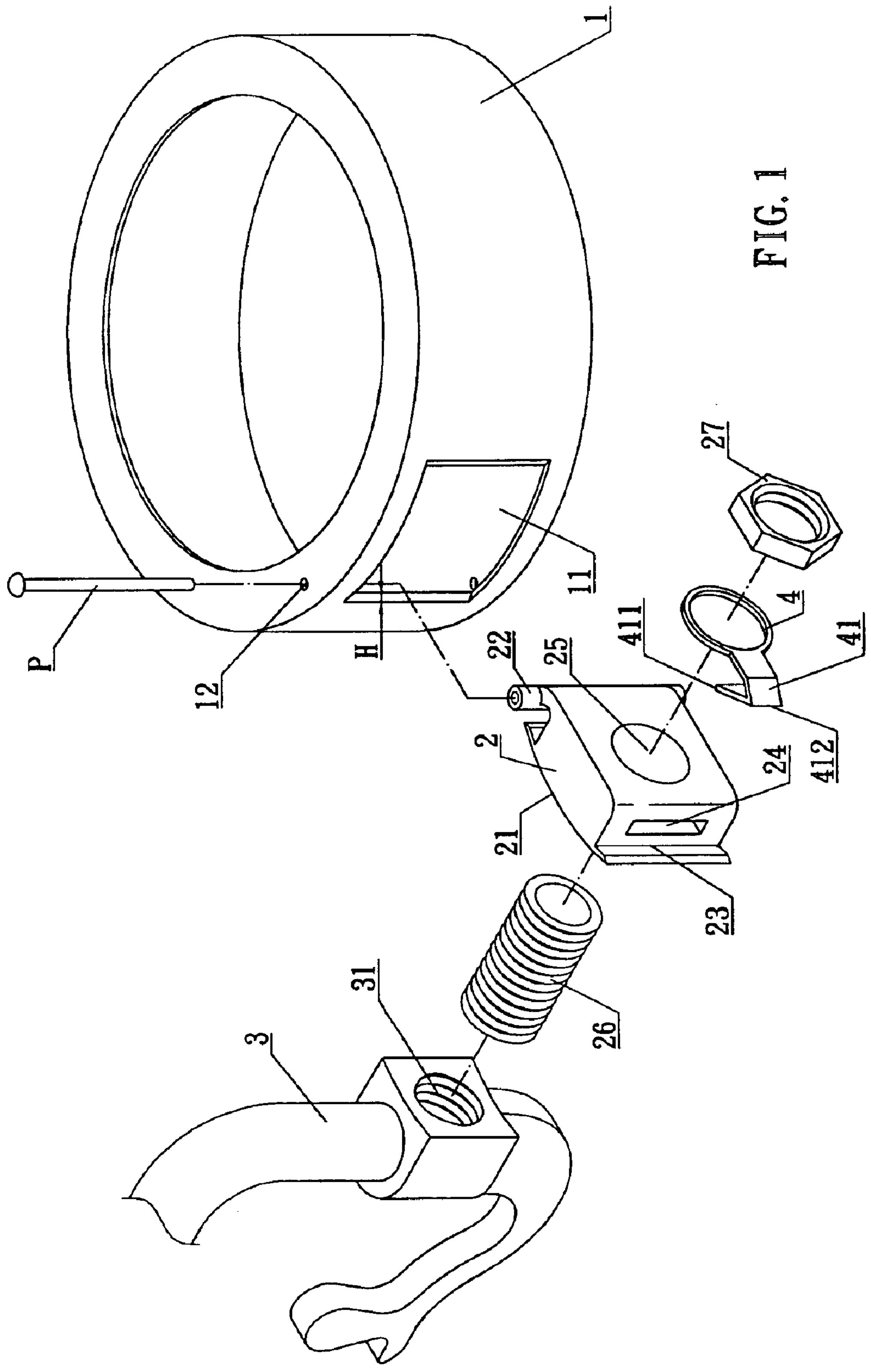
FIG. 1 is an exploded drawing of the invention herein.
Figure 2A:
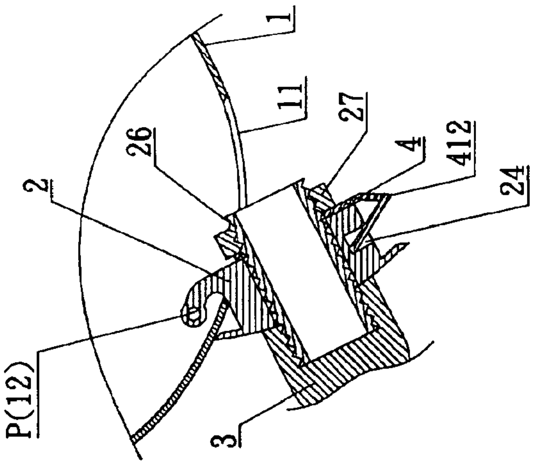
FIG. 2*a* is cross-sectional drawing of the invention herein.
Figure 2:
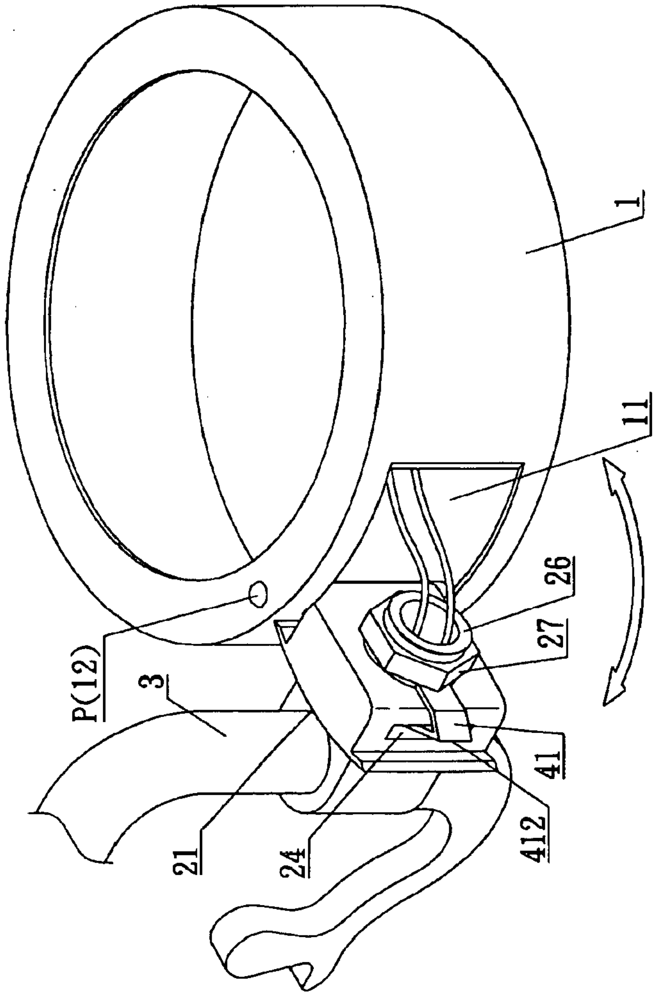
FIG. 2 is an isometric drawing of the invention herein.
Figure 3:
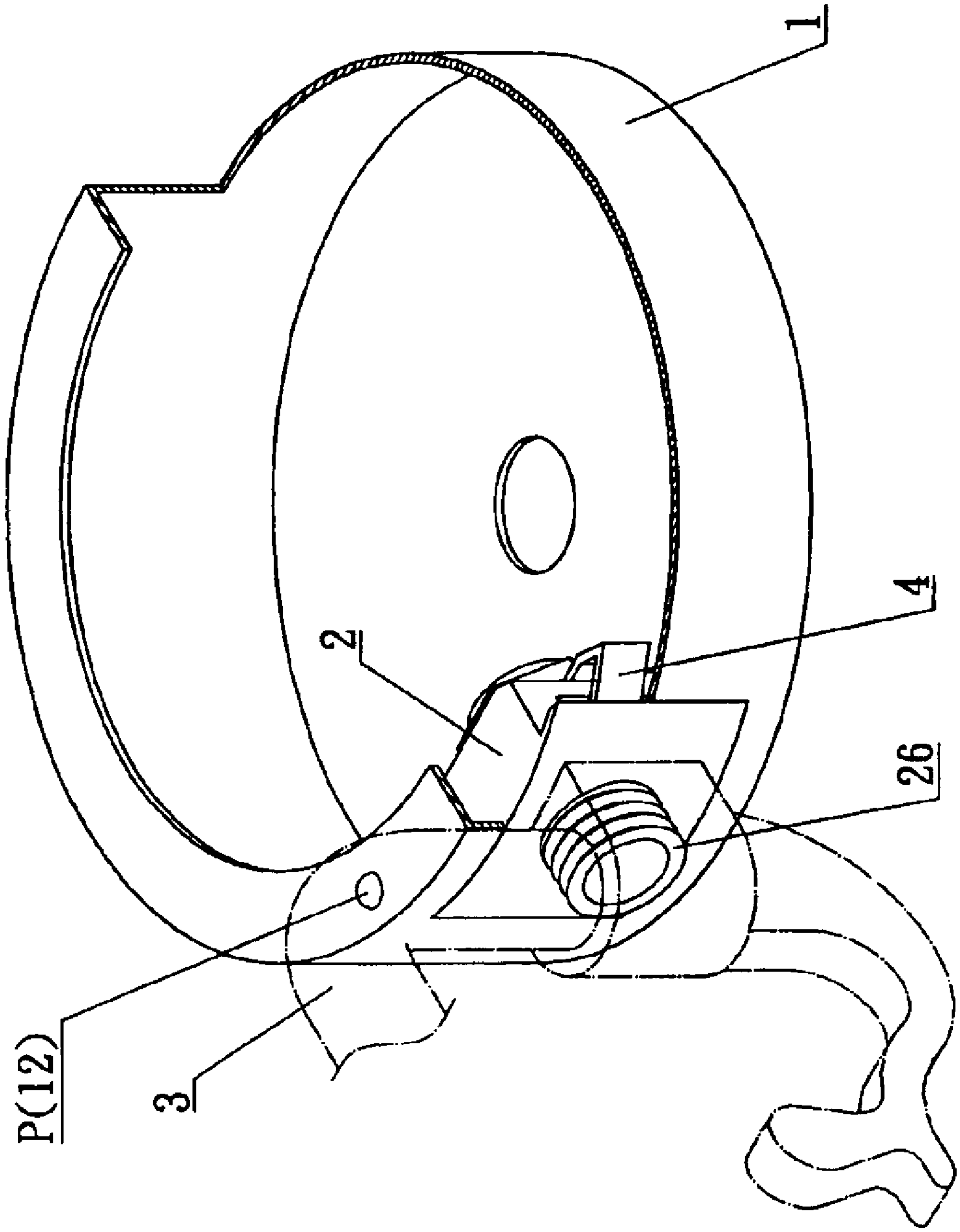
FIG. 3 is an isometric drawing of the lamp rod and the junction box in the inserted state.

Referring to FIG. 1 and FIG. 2, the structural arrangement of the invention herein, the present invention is comprised of a swivel block 2 movably disposed in a portal 11 in the side of a junction box 1 and a lamp rod 3 fastened to the swivel block 2, wherein:

Said junction box 1 has a plurality of portals 11 appropriately arrayed along the plane of its circumference and, furthermore, a pivot hole 12 is formed in the top surface at the lateral edge of each portal 12 in the junction box 1 to provide for movably locating a swivel block 2; the thickness along the peripheral edge H of each junction box 1 portal 11 is contoured inward a certain degree and the circumferential surface 21 of the swivel block 2 is checked against the junction box 1 peripheral edge H, with the circumferential surface 21 of the swivel block 2 and the junction box 1 having the same degree of curvature.

Said swivel block 2 circumferential surface 21 and the junction box 1 circumferential edge are congruent circle segments and, furthermore, a joint section 22 is contoured over the side of the swivel block 2 such that it extends into the junction box 1, and said joint section 22 is aligned with the junction box 1 pivot hole 12 and movably positioned thereon by an inserted pintle P; a stepped surface 23 is formed such it recedes towards the inner edge of the swivel block 2 circumferential surface 21 and, furthermore, a clearance hole 24 is disposed in the stepped surface 23 near the circumferential surface 21; a main hole 25 is formed in the center of the swivel block 2 and, furthermore, the main hole 25 accommodates the insertion of a threaded stud 26; one end of the threaded stud 26 is fastened to a threaded hole 31 on the lamp rod 3 and the opposite end is inserted through the swivel block 2 main hole 25 and a prepositioned lock ring 4, following which a nut 27 is installed onto the threaded stud 26 to fasten the lock ring 4 into position on the side of the swivel block 2.

Said lock ring 4 has a laterally projecting, <-shaped spring element 41 and, furthermore, the free end 411 of said spring element 41 extends into the swivel block 2 clearance hole 24, enabling the vertex portion 412 to protrude slightly to the side of the swivel block 2 circumferential surface 21 such that when the swivel block 2 joint section 22 is conjoined to the junction box 1, said spring element 41 vertex portion 412 engages the lateral edge of the junction box 1 portal 11, thereby securing the swivel block 2 onto the junction box 1 portal 11.

Figure 4:
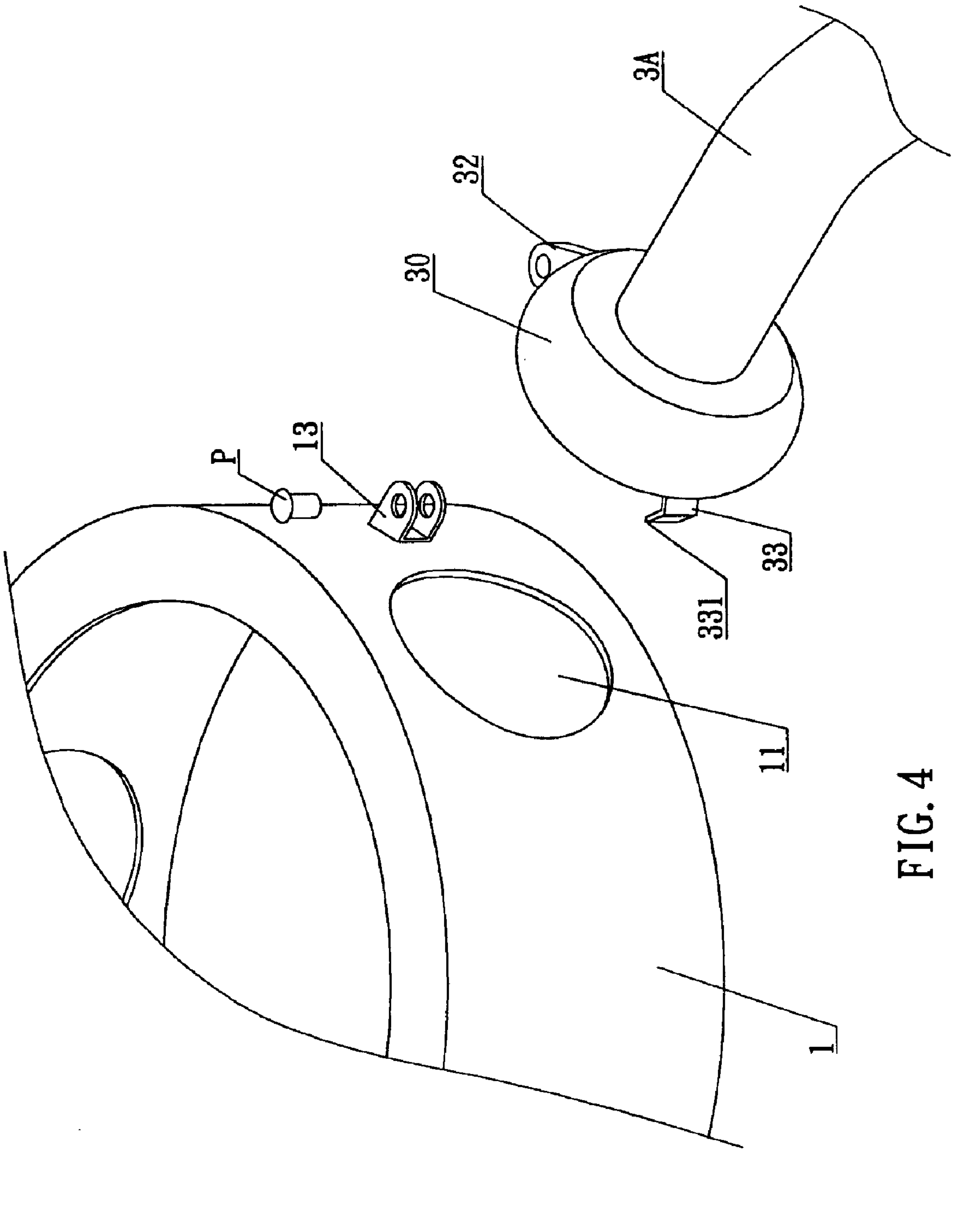
FIG. 4 is an exploded drawing of another embodiment of the invention herein.
Figure 5B:
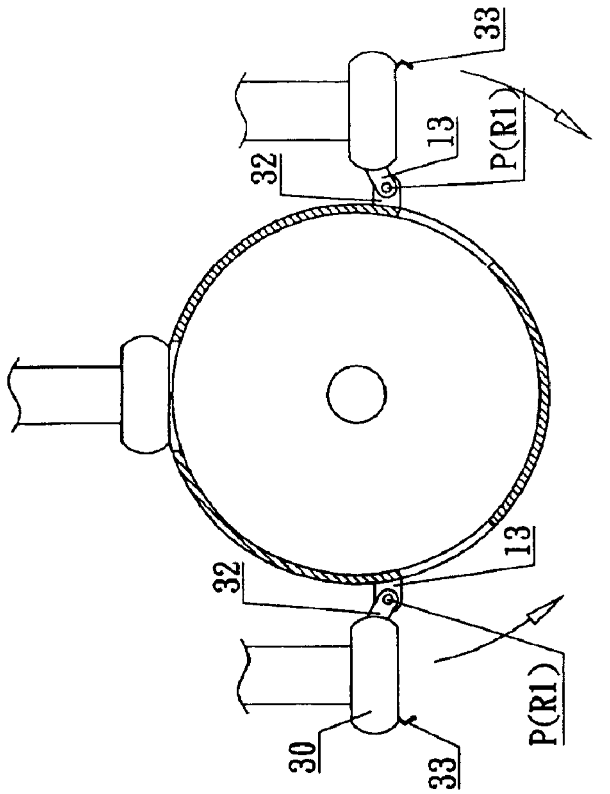
FIG. 5 is an orthographic drawing of invention herein in the unfolded and the folded state.
Figure 5A:
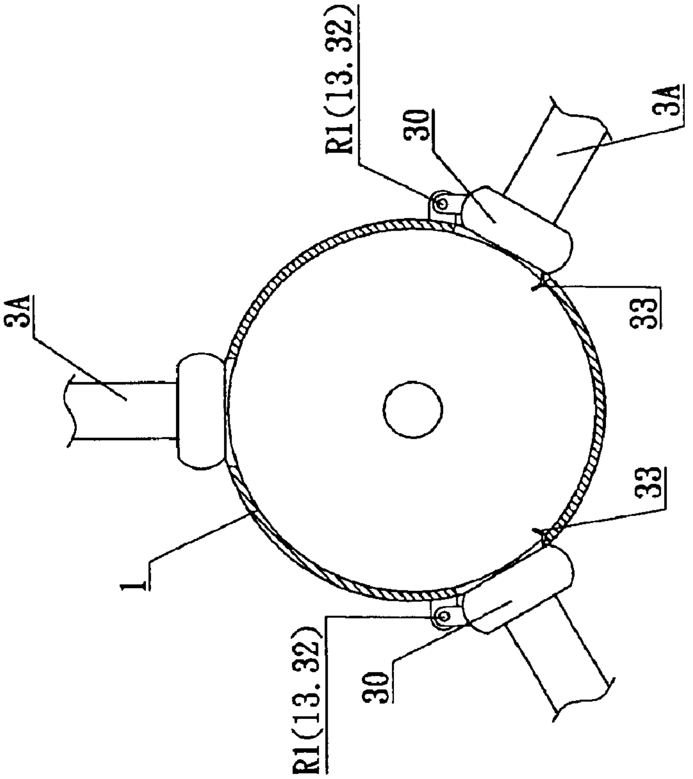

Referring to FIG. 4 and FIG. 5, the drawings of another embodiment of the invention herein, said junction box 1 has a hinge mount 13 projecting laterally from the portal 11 and, furthermore, the lamp rod 3A includes a hinge tab 32 that enters the hinge mount 13, a pintle P is inserted downward through the hinge tab 32 to position the hinge tab 32 onto the hinge mount 13; a <-shaped spring element 33 is situated in the proximal extremity of the lamp rod 3 and, furthermore, the vertex portion 331 of the <-shaped spring element 33 protrudes slightly to the circumferential edge 30 such that when the joint section R1 is conjoined to the junction box 1, said spring element 33 vertex portion 331 engages the lateral edge of the junction box 1 portal 11, thereby securing the lamp rod 3A onto the junction box 1 portal 11.

Figure 6A:
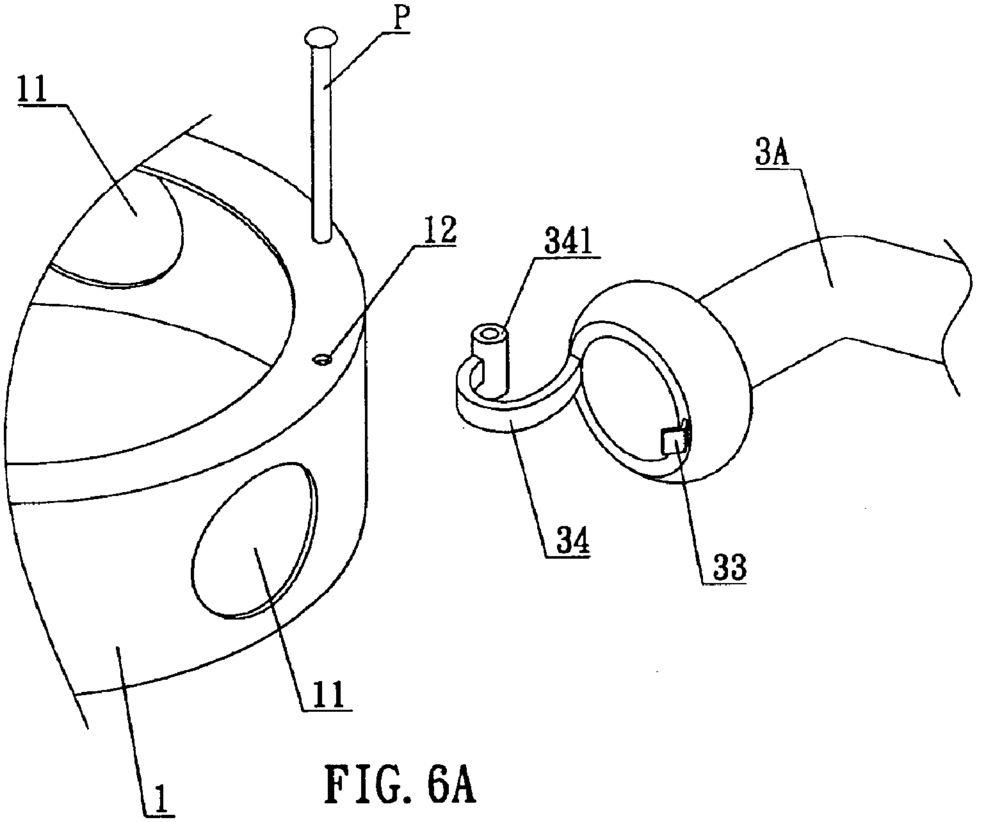
FIG. 6A is an exploded drawing of the third embodiment of the invention herein.
Figure 6B:
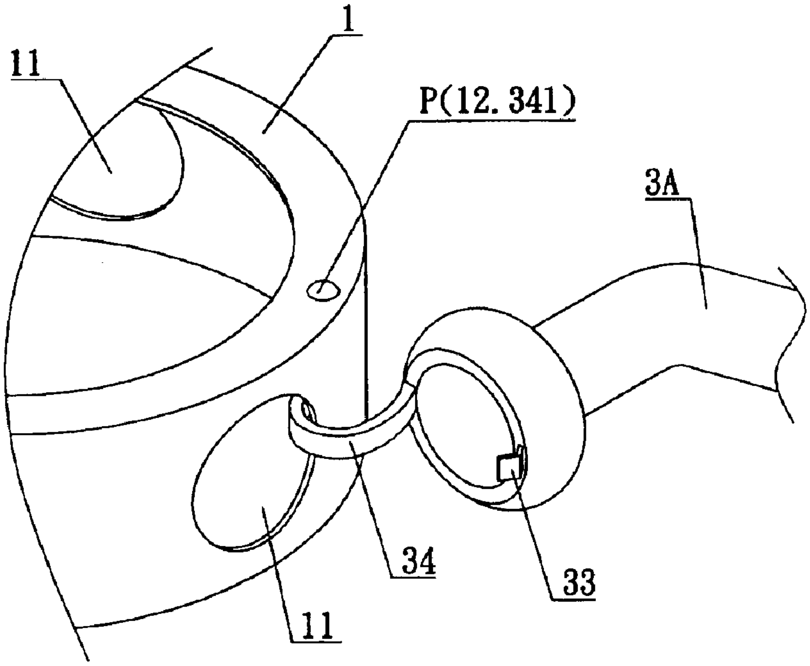
FIG. 6B is an isometric drawing of the third embodiment of the invention herein.
Figure 7A:
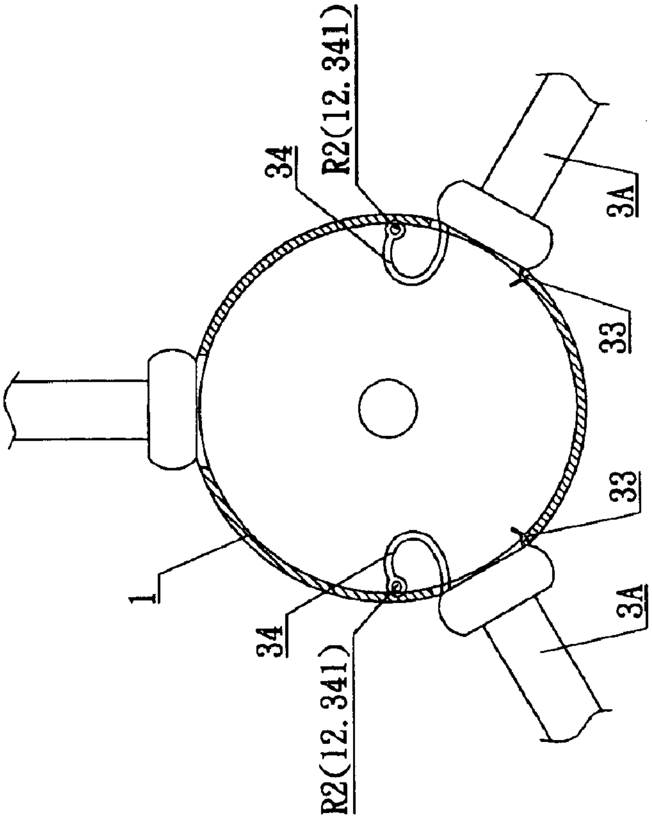
FIG. 7 is an orthographic drawing of another embodiment of the invention herein in the unfolded and the folded state.
Figure 7B:
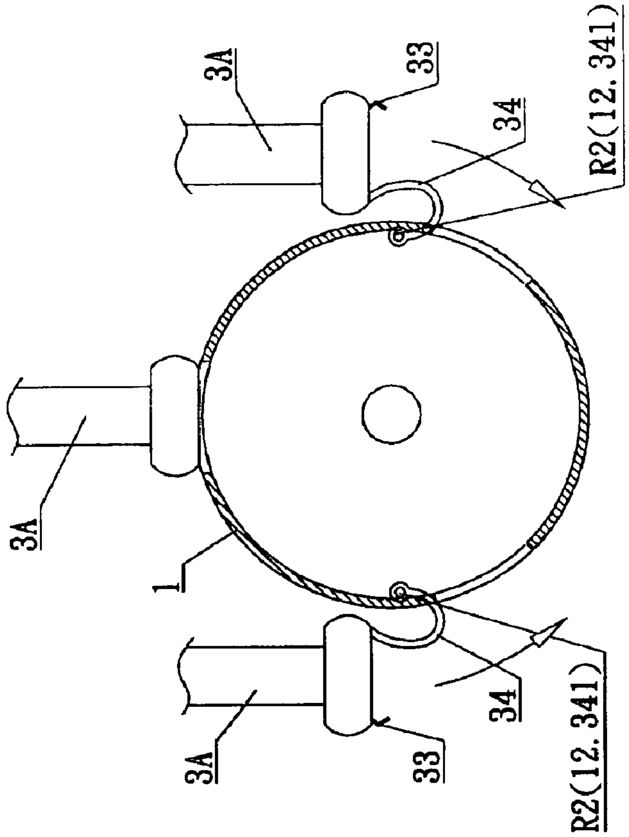
Figure 8:
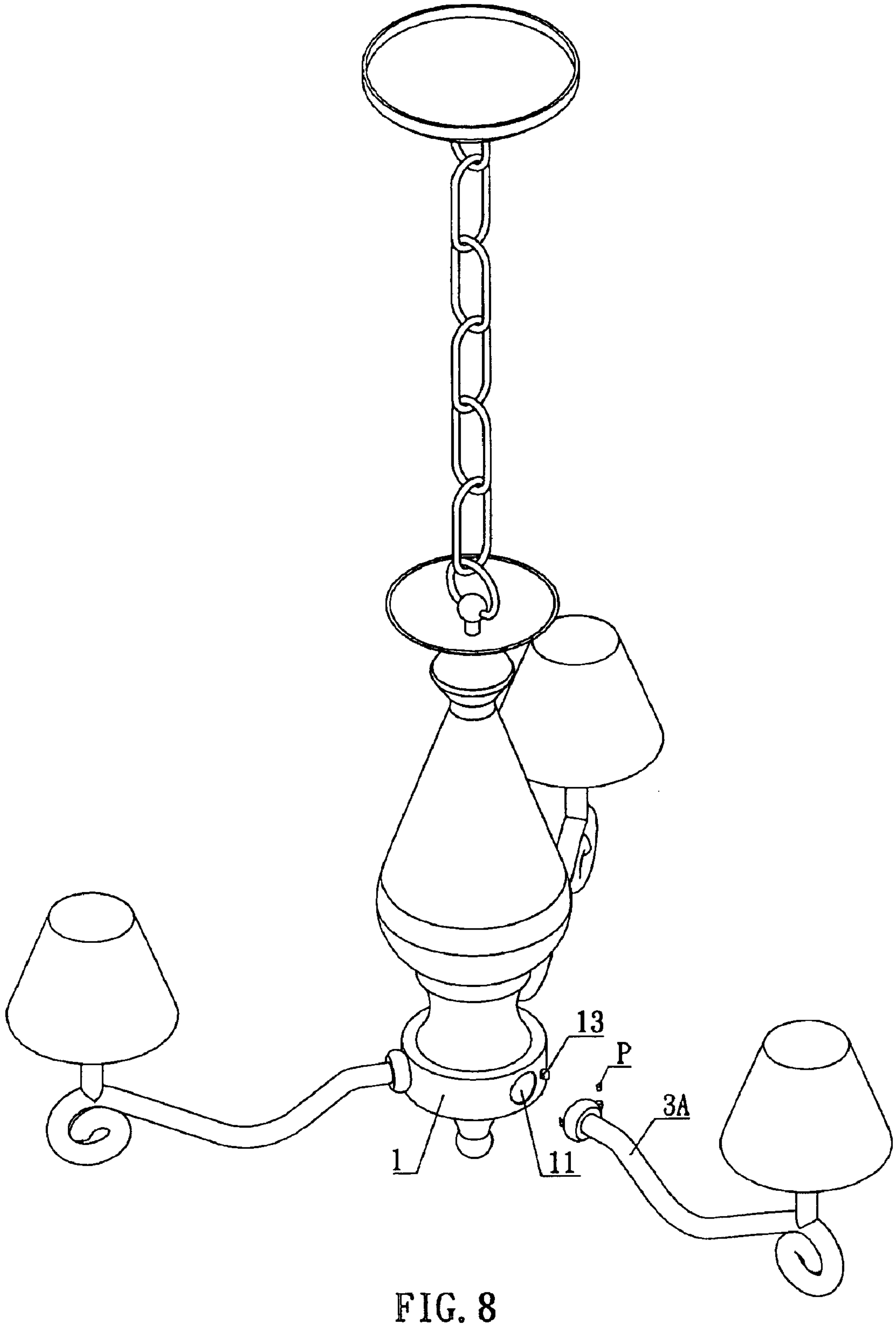
FIG. 8 is an isometric drawing of the ceiling lamp embodiment of the invention herein.

Referring to FIG. 6 and FIG. 7, the drawings of the third embodiment of the invention herein, said junction box 1 has a pivot hole 12 disposed in its top surface at the side of the portal 11 that provides for movably locating the lamp rod 3A and, furthermore, the lamp rod 3A includes an arcuate hinge tab 34 emerging from its extreme outer edge such that said hinge tab 34 is articulated into the junction box 1 pivot hole 12; a joint section 341 is aligned with the pivot hole 12 and, furthermore, a pintle P is inserted sequentially through the pivot hole 12 and the lamp rod 3A joint section 341 and the lamp rod 3A located onto a hinge mount 13; a <-shaped spring element 33 is situated in the proximal extremity of the lamp rod 3A and, furthermore, the vertex portion 331 of the <-shaped spring element 33 protrudes slightly to the lamp rod 3A circumferential edge 30 such that when the joint section R2 is conjoined to the junction box 1, said spring element 33 vertex portion 331 engages the lateral edge of the junction box 1 portal 11, thereby securing the lamp rod 3A onto the junction box 1 portal 11.

Configuring the lamp rods 3*a* and the junction box 1 in a hinged state provides for the rotation of the lamp rods 3*a* via the joint sections R1 and R2 as well as the adjustment of the lamp rod 3*a* and junction box 1 angle, enabling the posturing of the lamp rods 3*a* into a parallel arrangement to thereby reduce the overall space occupied by the lamp rods 3*a* and the junction box 1 when they are shipped.

What is claimed is:

1. A folding lamp rod and junction box structure for lamps comprised of a junction box and lamp rods hinged to said junction box, wherein:

said junction box has a plurality of portals appropriately arrayed along the plane of its circumference and, furthermore, a pivot hole is formed in the top surface at the lateral edge of each said portal in said junction box to provide for movably locating said lamp rods;

each said lamp rod has a joint section at its proximal extremity that is hinged to said junction box and, furthermore, said joint section is coupled via said junction box pivot hole; said lamp rod has a spring element situated at an appropriate area and, furthermore, a vertex portion of said spring element protrudes slightly to the circumferential edge of said lamp rod such that when its joint section is conjoined to said junction box, said spring element vertex portion engages the lateral edge of said junction box portal, thereby securing said lamp rod onto said junction box portal;

as such, said lamp rod and a junction box angle can be appropriately adjusted into a parallel arrangement to thereby reduce the overall space occupied by said lamp rods and said junction box when they are shipped.

2. As mentioned in claim 1 of the folding lamp rod and junction box structure for lamps of the invention herein, each said junction box portal has a thickness along its peripheral edge that is contoured inward a certain degree and a circumferential surface of a swivel block is checked against said junction box peripheral edge, with said circumferential surface of said swivel block and said junction box having the same degree of curvature.

3. As mentioned in claim 1 of the folding lamp rod and junction box structure for lamps of the invention herein, said lamp rod is conjoined to said junction box by means of a threaded stud fastened in a said swivel block and, furthermore, a swivel block circumferential surface and a junction box circumferential edge are congruent circle segments, the joint section is contoured over the side of said swivel block such that it extends into said junction box, and said joint section is aligned with said junction box pivot hole and movably positioned thereon by an inserted pintle; a stepped surface is formed such it recedes towards the inner edge of said swivel block circumferential surface and, furthermore, a clearance hole is disposed in said stepped surface near said circumferential surface; a lock ring is prepositioned on the opposite end of said threaded stud inserted through said swivel block and a nut installed onto the opposite end of said threaded stud to fasten said lock ring into position on the side of said swivel block.

4. As mentioned in claim 3 of the folding lamp rod and junction box structure for lamps of the invention herein, said lock ring has a laterally projecting, <-shaped spring element and, furthermore, a free end of said spring element extends into said swivel block clearance hole, enabling a vertex portion to protrude slightly to the side of said swivel block circumferential surface.

5. A folding lamp rod and junction box structure for lamps comprised of a junction box and lamp rods hinged to said junction box, wherein said junction box has a hinge mount projecting laterally from a portal and, furthermore, said lamp rod includes a hinge tab that enters said hinge mount, a pintle is inserted downward through said hinge tab to position said hinge tab onto said hinge mount; a <-shaped spring element is situated in the proximal extremity of said lamp rod and, furthermore, a vertex portion of said <-shaped spring element protrudes slightly to the circumferential edge of said lamp rod such that when a joint section is conjoined to said junction box, said spring element vertex portion engages the lateral edge of said junction box portal, thereby securing said lamp rod onto said junction box portal.

6. A folding lamp rod and junction box structure for lamps comprised of a junction box and lamp rods hinged to said junction box, wherein said junction box has a pivot hole disposed in its top surface at the side of a portal that provides for movably locating said lamp rod and, furthermore, said lamp rod includes an arcuate hinge tab emerging from its extreme outer edge such that said hinge tab is articulated into said junction box pivot hole; a joint section is aligned with said pivot hole and, furthermore, a pintle is inserted sequentially through said pivot hole and said lamp rod joint section and said lamp rod is located onto a hinge mount; a <-shaped spring element is situated in the proximal extremity of said lamp rod and, furthermore, a vertex portion of said <-shaped spring element protrudes slightly to said lamp rod circumferential edge such that when its joint section is conjoined to said junction box, said spring element vertex portion engages the lateral edge of said junction box portal, thereby securing said lamp rod onto said junction box portal.

* * * * *